F. B. CRAVER.
SEPARATOR FOR PNEUMATIC CLEANERS.
APPLICATION FILED OCT. 12, 1909.
946,535.
Patented Jan. 18, 1910.
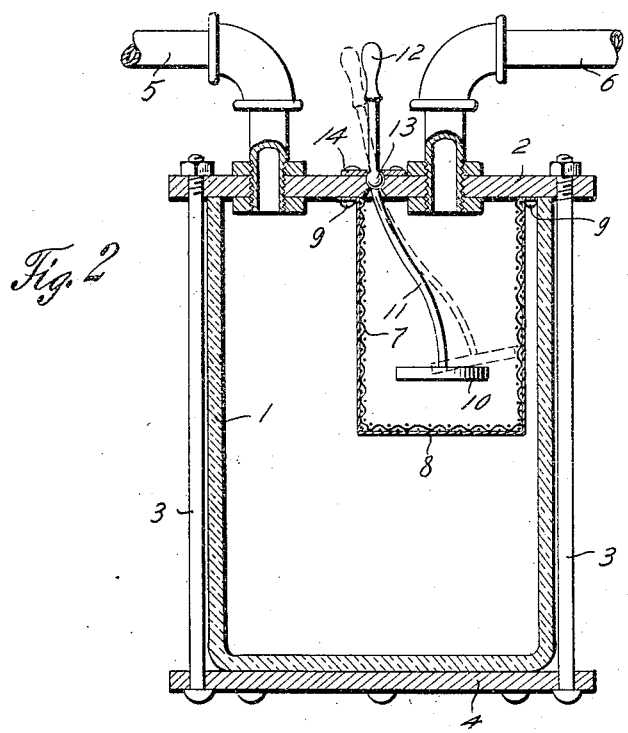
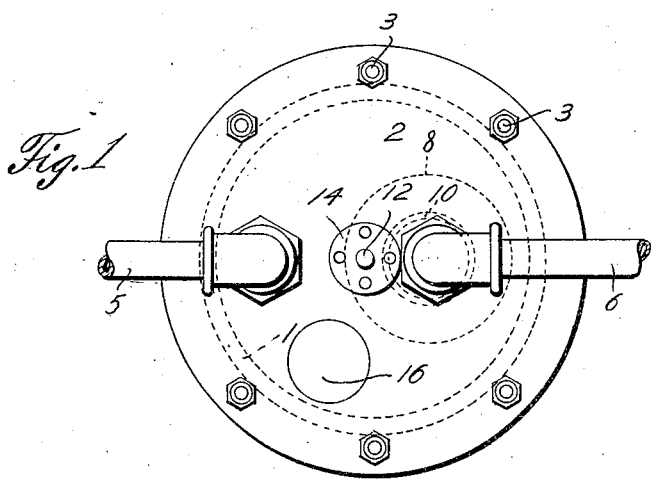
Witnesses
E. Larson.
S. E. Dodge.
Inventor
F. B. Craver,
By Beeler & Robb
Attorneys

UNITED STATES PATENT OFFICE.

FRANK B. CRAVER, OF ROCHESTER, NEW YORK.

SEPARATOR FOR PNEUMATIC CLEANERS.

946,535.         Specification of Letters Patent.    Patented Jan. 18, 1910.

Application filed October 12, 1909. Serial No. 522,266.

*To all whom it may concern:*

Be it known that I, FRANK B. CRAVER, citizen of the United States, residing at Rochester, in the county of Monroe and State of New York, have invented certain new and useful Improvements in Separators for Pneumatic Cleaners, of which the following is a specification.

This invention relates to apparatus for removing dust and is of that type which is now being extensively used, and which comprises a suitable suction nozzle for movement over a surface to be cleaned, a suction creating device, and a suitable separator for collecting the dust, dirt, or impurities which are removed from the surface by means of the apparatus.

More especially, the present invention involves a peculiar form of separator to be used in conjunction with the other parts of the apparatus hereinbefore referred to, and the special advantages of the novel construction will be appreciated more fully hereinafter.

For a full understanding of the invention, reference is to be had to the following detail description and to the accompanying drawings, in which—

Figure 1 is a top plan view of a separator for vacuum cleaning apparatus of the type of the invention, and Fig. 2 is a vertical sectional view of said separator bringing out clearly the construction of the device forming the essential feature of the invention.

Throughout the following detail description and on the several figures of the drawings similar parts are referred to by like reference characters.

Specifically describing the invention and referring particularly to the drawings, the numeral 1 denotes a receptacle made of transparent substance, preferably of glass, and in the form of a cylindrical jar. The upper end of the receptacle 1 is closed by a top 2 of wood, or the like, said top having its peripheral portion projecting beyond the sides of the receptacle 1 and being connected by means of bolts or tie rods 3 with a base 4 upon which the receptacle 1 rests. Connected with the top 2 is an inlet pipe 5 through which air laden with dust or other impurities is adapted to pass into the receptacle 1, said air passing out of the receptacle through an outlet pipe 6 also connected with the top 2 in the manner shown in the drawings. The dirt-laden air passing through the receptacle 1 has the impurities carried thereby separated therefrom by means of a suitable filter shown at 7, said filter comprising a cylindrical body made of screen or other reticulated material, the latter being provided with a covering of fabric 8. The body 7 of the filter is provided with a flange at its upper end secured to the under side of the top 2 by suitable fastenings 9, and the outlet pipe 6 communicates with the receptacle 1 within the filter aforesaid, necessitating that the dirt-laden air pass through the filter in order to pass out of the receptacle 1 through the pipe 6 which leads to a suitable vacuum or suction creating means, not shown. Arranged within the filter body 7 is a knocker 10 in the form of a hammer, or the like, and which is carried by a pendent arm 11 passing upwardly through the top 2 and having a suitable operating handle 12. A ball formed in the length of the arm 11 affords a ball and socket connection 13 between the top 2 and the knocker, said ball being seated in a socket in the top 2, and the arm being prevented from displacement by means of a plate 14 secured to the upper side of the top 2 and having an opening through which the arm 11 passes. By operation of the handle 12 the knocker 10 may be readily vibrated so as to strike the sides of the screen body 7 of the filter whereby to also vibrate the latter so as to precipitate dust or other impurities, that may adhere to the fabric covering 8, to the bottom of the receptacle 1. The receptacle 1 thus forms a separator for separating dust and other impurities from the air passing through the said receptacle, and the provision of a transparent body for the receptacle 1 facilitates observation of the deposit of dirt therein. A suitable opening 16 is provided in the top 2 and closed by any desirable device, whereby to permit of removal of the deposits in the separator or receptacle 1.

Having thus described the invention, what is claimed as new is:

In a separator for dust removing apparatus, the combination of a receptacle of transparent substance, a top closing the upper end thereof, a base upon which the receptacle rests, detachable connections between the top and base and arranged at the sides of the receptacle, air inlet and outlet pipes communicating with the interior of the receptacle through the top, a filter arranged in the receptacle and consisting of a cylindrical screen body fastened to the top and surrounding the adjacent end of the outlet pipe, a dependent arm movable in said screen body and provided with a knocker arranged to strike the sides of the body, a handle connected with said arm for vibrating the latter, and a ball and socket connection between the arm and the top.

In testimony whereof I affix my signature in presence of two witnesses.

FRANK B. CRAVER.

Witnesses:
 ERWIN E. HUNT,
 C. M. HEDGES.